(12) United States Patent
Rejaee et al.

(10) Patent No.: US 10,954,133 B2
(45) Date of Patent: *Mar. 23, 2021

(54) SYSTEMS AND METHODS OF PRODUCING POTASSIUM SULFATE

(71) Applicant: NOVOPRO PROJECTS INC., Montréal (CA)

(72) Inventors: Maziar Rejaee, Montréal (CA); Tom Neuman, Millcreek, UT (US); Richard Warren Chastain, Grand Junction, CO (US); Antoine Lefaivre, Montréal (CA)

(73) Assignee: NOVOPRO PROJECTS INC., Montréal (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/001,679

(22) Filed: Aug. 25, 2020

(65) Prior Publication Data

US 2020/0385279 A1    Dec. 10, 2020

Related U.S. Application Data

(63) Continuation of application No. 16/755,155, filed as application No. PCT/CA2018/051280 on Oct. 11, 2018, now Pat. No. 10,815,130.

(Continued)

(51) Int. Cl.
*C01D 15/06* (2006.01)
*B01J 19/06* (2006.01)
(Continued)

(52) U.S. Cl.
CPC .......... *C01D 15/06* (2013.01); *B01D 9/0063* (2013.01); *B01D 21/0084* (2013.01); *B01J 14/00* (2013.01);
(Continued)

(58) Field of Classification Search
CPC .... C01D 5/06; C01D 5/10; B01J 14/00; B01J 19/00; B01D 9/00; B01D 21/00
See application file for complete search history.

(56) References Cited

U.S. PATENT DOCUMENTS

| 2,902,344 A | 9/1959 | Cevidalli et al. |
| 3,058,806 A | 10/1962 | Ebner |

(Continued)

FOREIGN PATENT DOCUMENTS

| CA | 2869255 | 10/2013 |
| CN | 102205976 | 10/2011 |

(Continued)

OTHER PUBLICATIONS

English Translation—Machine Generated of SU426359A3, "Method of obtaining potassium sulfate", published on Apr. 30, 1974.

(Continued)

*Primary Examiner* — Timothy C Vanoy
(74) *Attorney, Agent, or Firm* — Bereskin & Parr LLP/S.E.N.C.R.L., s.r.l.

(57) ABSTRACT

Systems and methods of producing potassium sulfate can involve converting a mixed salts feed stream into a conversion end slurry in a conversion unit, the mixed salts feed comprising at least one potassium-containing salt, at least one chloride-containing salt, at least one magnesium-containing salt and at least one sulfate-containing salt and the conversion end slurry comprising schoenite; separating conversion end slurry into a conversion end solids stream and a conversion brine; leaching the conversion end solids stream in a crystallization unit to produce a potassium sulfate product stream comprising potassium sulfate and a crystallizer mother liquor comprising magnesium sulfate and potassium sulfate; collecting heat generated in the conversion unit by a heat pump; and providing at least a portion of the heat collected to the crystallization unit to regulate a (Continued)

temperature of the potassium sulfate product stream and the crystallizer mother liquor stream contained in the crystallization unit.

25 Claims, 6 Drawing Sheets

Related U.S. Application Data

(60) Provisional application No. 62/572,073, filed on Oct. 13, 2017.

(51) Int. Cl.
    *B01J 19/00*     (2006.01)
    *B01J 14/00*     (2006.01)
    *B01D 21/00*     (2006.01)
    *B01D 9/00*     (2006.01)

(52) U.S. Cl.
    CPC .......... *B01J 19/0013* (2013.01); *B01J 19/06* (2013.01); *B01D 2009/0086* (2013.01); *B01J 2219/00117* (2013.01)

(56) References Cited

U.S. PATENT DOCUMENTS

| | | | |
|---|---|---|---|
| 3,528,767 A | | 9/1970 | Garrett |
| 3,589,771 A | | 6/1971 | Harris |
| 3,634,041 A | * | 1/1972 | Ryan ........................ C01D 5/00 23/297 |
| 4,129,642 A | * | 12/1978 | Neitzel .................... C01D 5/10 423/166 |
| 8,802,048 B2 | * | 8/2014 | Chastain .................. C01D 5/12 423/551 |

FOREIGN PATENT DOCUMENTS

| | | | |
|---|---|---|---|
| SU | 426359 | | 4/1974 |
| SU | 767 030 B | * | 9/1980 ............... C01D 5/16 |
| WO | 2005063626 | | 7/2005 |
| WO | 2017108876 | | 6/2017 |

OTHER PUBLICATIONS

Moritz et al., "Producing Sulfate of Potash from Polyhalite with Cost Estimates", Prepared for Icpotash Corp, dated Mar. 23, 2010.
English Translation—Machine Generated of CN102205976A, "Recovery Method of Potassium Ions in Flotation Tailing Liquid and Tailing", published on Oct. 5, 2011.

* cited by examiner

SYSTEMS AND METHODS OF PRODUCING POTASSIUM SULFATE

CROSS-REFERENCE TO RELATED APPLICATIONS

The present application is a continuation application of U.S. patent application Ser. No. 16/755,155 filed on Apr. 10, 2020 that is a 35 USC 371 national stage entry of PCT/CA2018/051280 filed on Oct. 11, 2018 and which claims priority to U.S. Patent Application No. 62/572,073 filed on Oct. 13, 2017. These documents are hereby incorporated by reference in their entirety.

TECHNICAL FIELD

The embodiments disclosed herein relate to systems and methods of producing potassium sulfate, and, in particular to systems and methods of producing potassium sulfate from schoenite.

INTRODUCTION

It is well understood that the sulfate rich mother liquor resulting from water decomposition of schoenite to produce $K_2SO_4$ (also known as sulfate of potassium or "SOP") is used to convert potassium containing mixed salts to a mixture of primarily schoenite and halite. The decomposition of schoenite to produce SOP is best conducted at a temperature between about 45° C. and 60° C., while the conversion reactions are best conducted at a temperature between about 10° C. and 40° C. Both of these temperature ranges are well known. The combined reactions occurring in conversion are exothermic, meaning that heat must be removed from the system to maintain a desired operating temperature. Different methods are available to provide cooling to the conversion system.

In the conventional schoenite process, schoenite is leached with water to produce a slurry of potassium sulfate in a sulfate liquor. The sulfate liquor is separated from the SOP product and is forwarded to a schoenite-conversion reaction vessel where it is mixed with feed salts. The feed salts can be multiple combinations of potassium-containing salts, chloride-containing salts and sulfate-containing salts. The conversion reaction produces a slurry of schoenite, and possibly other salts, in a schoenite-conversion end liquor. The schoenite-conversion end liquor, which still contains substantial quantities of potassium and sulfates, may be further processed, such as in solar ponds or other evaporative processes, to improve process recovery. The evaporation process will result in salt crystals that can be treated in the process described above. The conventional schoenite process is known for its sulfate excess and as such, sulfate removal operations might be required on conversion end liquor or other process streams. The schoenite solids can be subjected to an upgrading step or not, depending on the achieved purity, and then be leached to produce SOP solids. This reaction can operate over a wide range of temperatures, with the highest theoretical recovery being between 45° C. and 60° C. As the SOP crystallization reaction is endothermic, heat must be added to the system to maintain the operating temperature. Different methods are available to provide heating to the crystallization system.

Accordingly, there is a need for maintaining specific reaction temperatures in the conversion and crystallization steps of processes that produce SOP. There is also a need for controlling specific reaction temperatures in the conversion and crystallization steps of processes that produce SOP.

SUMMARY

According to some embodiments, a method of producing potassium sulfate is provided. The method includes converting a mixed salts feed stream into a conversion end slurry in a conversion unit, the mixed salts feed stream comprising at least one potassium-containing salt, at least one chloride-containing salt, at least one magnesium-containing salt and at least one sulfate-containing salt and the conversion end slurry comprising schoenite; separating the conversion end slurry into a conversion end solids stream and a conversion brine by a solid-liquid separator; leaching the conversion end solids stream with water in a crystallization unit to produce a potassium sulfate product stream comprising potassium sulfate and a crystallizer mother liquor stream comprising magnesium sulfate and potassium sulfate; collecting heat generated in the conversion unit by a heat pump; and providing at least a portion of the heat collected from the conversion unit to the crystallization unit to regulate a temperature of the potassium sulfate product stream and the crystallizer mother liquor stream contained in the crystallization unit.

According to some embodiments, another method of producing potassium sulfate is provided herein. The method includes converting a mixed salts feed stream into a conversion end slurry in a conversion unit, the mixed salts feed stream comprising at least one potassium-containing salt, at least one chloride-containing salt, at least one magnesium-containing salt and at least one sulfate-containing salt and the conversion end slurry comprising schoenite; separating the conversion end slurry into a conversion end solids stream and a conversion brine stream by a solid-liquid separator; leaching the conversion end solids stream in a leaching unit to produce a mother liquor stream and a schoenite stream; leaching the schoenite stream with water in a crystallization unit to produce a potassium sulfate product stream comprising potassium sulfate and an crystallizer mother liquor stream comprising magnesium sulfate and potassium sulfate; returning the crystallizer mother liquor to the leaching unit to produce the mother liquor stream and the schoenite stream; and returning the mother liquor stream to the conversion unit for the conversion of the mixed salts feed stream into the conversion end slurry.

According to some embodiments, another method of producing potassium sulfate is provided herein. The method includes converting a mixed salts feed stream into a conversion end slurry in a conversion unit, the mixed salts feed stream comprising at least one potassium-containing salt, at least one chloride-containing salt, at least one magnesium-containing salt and at least one sulfate-containing salt and the conversion end slurry comprising schoenite; separating the conversion end slurry into a conversion end solid stream and a conversion brine by a solid-liquid separator; separating the conversion end solid stream into a schoenite slurry stream and a tailings slurry stream in a flotation unit; leaching the schoenite slurry stream in a leaching unit to produce a mother liquor stream and a schoenite stream; leaching the schoenite stream with water in a crystallization unit to produce a potassium sulfate product stream comprising potassium sulfate and a crystallizer mother liquor stream comprising magnesium sulfate and potassium sulfate; and leaching the tailings slurry stream with a dilute brine stream in a tailings unit to produce a tailings stream and a brine recycle stream, the brine recycle stream comprising potassium.

According to some embodiments, a system for producing potassium sulfate is provided herein. The system includes a conversion unit for converting a mixed salts feed stream into a conversion end slurry, the mixed salts feed stream comprising at least one potassium-containing salt, at least one chloride-containing salt, at least one magnesium containing salt and at least one sulfate-containing salt and the conversion end slurry comprising schoenite; a solid-liquid separator coupled to the conversion unit for separating the conversion end slurry into a conversion end solids stream and a conversion end brine stream; a crystallization unit coupled to the solid-liquid separator for receiving the conversion end solids stream and leaching the conversion end solids stream with water to produce a potassium sulfate product stream comprising potassium sulfate and an crystallizer mother liquor stream comprising magnesium sulfate and potassium sulfate; and a heat pump coupled to the conversion unit and the crystallization unit for collecting heat generated in the conversion unit and providing at least a portion of the heat collected from the conversion unit to the crystallization unit to regulate a temperature of the solid potassium product stream and the crystallizer mother stream contained in the crystallization unit.

According to some embodiments, another system for producing potassium sulfate is provided herein. The system includes a conversion unit for converting a mixed salts feed stream into a conversion end slurry, the mixed salts feed stream comprising at least one potassium-containing salt, at least one chloride-containing salt, at least one magnesium containing salt and at least one sulfate-containing salt and the conversion end slurry comprising schoenite; a solid-liquid separator coupled to the conversion unit for separating the conversion end slurry into a conversion end solids stream and a conversion end brine stream; a flotation unit coupled to the solid-liquid separator for separating the conversion end slurry into a schoenite slurry stream and a tailings slurry stream; a leaching unit coupled to the flotation unit for leaching the schoenite slurry stream to produce a mother liquor stream and a schoenite stream; and a crystallization unit coupled to the leaching unit for leaching the schoenite stream with water to produce a potassium sulfate product stream comprising potassium sulfate and a crystallizer mother liquor stream comprising magnesium sulfate and potassium sulfate; wherein the crystallizer mother liquor stream is returned to the leaching unit to produce the mother liquor stream and the schoenite stream; and wherein the mother liquor stream is returned to the conversion unit for the conversion of the mixed salts feed stream into the conversion end slurry.

According to some embodiments, another system for producing potassium sulfate is provided herein. The system includes a conversion unit for converting a mixed salts feed stream into a conversion end slurry, the mixed salts feed stream comprising at least one potassium-containing salt, at least one chloride-containing salt, at least one magnesium containing salt and at least one sulfate-containing salt and the conversion end slurry comprising schoenite; a solid-liquid separator coupled to the conversion unit for separating the conversion end slurry into a conversion end solids stream and a conversion end brine stream; a flotation unit coupled to the solid-liquid separator for separating the conversion end slurry into a schoenite slurry stream and a tailings slurry stream; a leaching unit coupled to the flotation unit for leaching the schoenite slurry stream to produce a mother liquor stream and a schoenite stream; a crystallization unit coupled to the leaching unit for leaching the schoenite stream with water to produce a potassium sulfate product stream comprising potassium sulfate and a crystallizer mother liquor stream comprising magnesium sulfate and potassium sulfate; and a tailings unit for leaching the tailings slurry stream with a dilute brine stream to produce a tailings stream and a brine recycle stream, the brine recycle stream comprising potassium.

According to some embodiments, use of a heat pump in a method of producing potassium sulfate for collecting heat generated in a conversion unit and providing at least a portion of heat collected from the conversion unit to a crystallization unit to regulate a crystallization temperature of the potassium sulfate is also provided herein.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings.

DETAILED DESCRIPTION

The following examples are presented in a non-limitative manner.

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

Terms of degree such as "about" and "approximately" as used herein mean a reasonable amount of deviation of the modified term such that the end result is not significantly changed. These terms of degree should be construed as including a deviation of at least ±5% or at least ±10% of the modified term if this deviation would not negate the meaning of the word it modifies.

For example, the methods can further comprise returning the crystallizer mother liquor stream to the conversion unit for mixing with the mixed salts feed stream for the conversion into the conversion end slurry.

For example, the methods can further comprise leaching the conversion end solids stream in a leaching unit to produce a mother liquor stream and a schoenite stream and then leaching the schoenite stream in the crystallization unit to produce the potassium sulfate product stream and the crystallizer mother liquor stream.

For example, the methods can further comprise returning the crystallizer mother liquor stream to the leaching unit to produce the mother liquor stream and the schoenite stream.

For example, the methods can further comprise returning the mother liquor stream to the conversion unit for the converting into the conversion end slurry.

For example, the methods can further comprise separating the conversion end solids stream into a schoenite slurry stream and a tailings slurry stream in a flotation unit and then leaching the schoenite slurry stream in a leaching unit to produce a mother liquor stream and a schoenite stream.

For example, the methods can further comprise leaching the tailings slurry stream with a dilute brine stream in a tailings unit to produce a tailings stream and a brine recycle stream, the brine recycle stream comprising potassium.

For example, the methods can further comprise returning the crystallizer mother liquor stream to the leaching unit to produce the mother liquor stream and the schoenite stream.

For example, the methods can further comprise returning the mother liquor stream to the conversion unit for the converting into the conversion end slurry.

For example, the methods can further comprise separating the potassium sulfate product stream into a crystallized potassium sulfate product stream and a recycle stream.

For example, the methods can further comprise returning the recycle stream to the crystallization unit.

For example, the providing the least a portion of the heat collected from the conversion unit to the crystallization unit can maintain the temperature of the potassium sulfate product stream and the crystallizer mother liquor stream contained in the crystallization unit at a value of about 45 to about 60° C.

For example, the providing the at least a portion of the heat collected from the conversion unit to the crystallization unit can regulate a temperature of the mixed salts feed stream and the conversion end slurry contained in the conversion unit.

For example, the providing the at least a portion of the heat collected from the conversion unit to the crystallization unit can maintain the temperature of the mixed salts feed stream and the conversion end slurry contained in the conversion unit at a value of about 10 to about 40° C.

For example, converting the mixed salts feed stream into a conversion end slurry is can be carried out at a temperature of about 10 to about 40° C.

For example, leaching the conversion end slurry with water can be carried out at a temperature of about 45 to about 60° C.

For example, the collecting of the heat generated in the conversion unit controls a temperature of the conversion unit at about 10 to about 40° C.

For example, the providing of at least a portion of the heat collected from the conversion unit controls a temperature of the crystallization unit at about 45 to about 60° C.

For example, the at least a portion of the heat collected from the conversion unit is expelled from the heat pump as excess heat.

For example, the methods can further comprise leaching the conversion end solids stream in a leaching unit prior to the leaching with the water in the crystallization unit; wherein the crystallizer mother liquor stream is returned to the leaching unit to leach the conversion end slurry and a mother liquor stream is returned from the leaching unit to the conversion unit.

For example, the methods can further comprise collecting heat generated in the leaching unit as a second heat source by the heat pump.

For example, the collecting of the heat generated in the leaching unit can maintain a temperature of the mother liquor stream and the schoenite stream in the leaching unit at a value of about 10 to about 40° C.

For example, the collecting of the heat generated in the leaching unit can maintain a temperature of the potassium sulfate product stream and the crystallizer mother liquor stream contained in the crystallization unit at a value of about 45 to about 60° C.

For example, the methods can further comprise returning at least a portion of the crystallizer mother liquor to the conversion unit for the conversion of the mixed salts feed stream into the conversion end slurry.

For example, the methods can further comprise leaching the tailings slurry stream with a dilute brine stream in a tailings unit to produce a tailings stream and a brine recycle stream, the brine recycle stream comprising potassium.

For example, the methods can further comprise separating a crystallized potassium sulfate product stream and a recycle stream from the potassium sulfate product stream using a solid-liquid separating unit.

For example, the methods can further comprise directing the recycle stream back to the crystallization unit.

For example, the methods can further comprise collecting heat generated in the conversion unit by a heat pump.

For example, the methods can further comprise providing at least a portion of the heat collected from the conversion unit to the crystallization unit to regulate a temperature of the potassium sulfate product stream and the crystallizer mother liquor stream contained in the crystallization unit.

For example, the temperature can be maintained at a value of about 45° C. to about 60° C.

For example, the collecting heat can be generated in the conversion unit by a heat pump regulates a temperature of the mixed salts feed stream and the conversion end slurry contained in the conversion unit.

For example, the temperature can be maintained at a value of about 10° C. to about 40° C.

For example, the converting the mixed salts feed stream into a conversion end slurry can be carried out at a temperature of about 10° C. to about 40° C.

For example, the leaching the conversion end slurry with water can be carried out at a temperature of about 45° C. to about 60° C.

For example, the collecting heat generated in the conversion unit can control a temperature of the conversion unit at about 10° C. to about 40° C.

For example, the providing of at least a portion of the heat collected from the conversion unit can control a temperature of the crystallization unit at about 45° C. to about 60° C.

For example, at least a portion of the heat collected from the conversion unit is expelled from the heat pump as excess heat.

For example, the methods can further comprise collecting heat generated in the leaching unit by the heat pump.

For example, the collecting of the heat generated in the leaching unit can maintain a temperature of the mother liquor stream and the schoenite stream in the leaching unit at a value of about 10° C. to about 40° C.

For example, the collecting of the heat generated in the leaching unit maintains a temperature of the solid potassium sulfate product stream and the crystallizer mother liquor stream contained in the crystallization unit at a value of about 45° C. to about 60° C.

For example, the brine recycle stream is forwarded for further processing for potassium recovery.

For example, the methods can further comprise returning the crystallizer mother liquor to the leaching unit to produce the mother liquor stream and the schoenite stream.

For example, the methods can further comprise returning the mother liquor stream to the conversion unit for the conversion of the mixed salts feed stream into the conversion end slurry.

For example, the methods can further comprise directing the recycle stream to the crystallization unit.

For example, the methods can further comprise providing at least a portion of the heat collected from the conversion unit to the crystallization unit to regulate a temperature of the potassium sulfate product stream and the crystallizer mother liquor stream contained in the crystallization unit.

For example, the collecting heat generated in the conversion unit by a heat pump regulates a temperature of the mixed salts feed stream and the conversion end slurry contained in the conversion unit.

For example, at least a portion of the heat collected from the conversion unit is expelled from the heat pump as excess heat.

For example, the methods can further comprise collecting heat generated in the leaching unit by the heat pump.

For example, the collecting of the heat generated in the leaching unit maintains a temperature of the potassium sulfate product stream and the crystallizer mother liquor stream contained in the crystallization unit at a value of about 45° C. to about 60° C.

For example, the methods can further comprise producing the mixed salts stream in a flotation unit prior to converting the mixed salts stream in the conversion unit.

For example, the systems can further comprise recycle piping for returning the crystallizer mother liquor stream to the conversion unit from the crystallization unit for mixing with the mixed salts feed stream for the converting into the conversion end slurry.

For example, the systems can further comprise a leaching unit for leaching the conversion end solids stream to produce a mother liquor stream and a schoenite stream, the schoenite stream received by the crystallization unit to produce the solid potassium sulfate stream and the crystallizer mother liquor stream.

For example, the systems can further comprise a crystallizer recycle piping for returning the crystallizer mother liquor stream to the leaching unit to produce the mother liquor stream and the schoenite stream.

For example, the systems can further comprise a concentrator recycle piping for returning the mother liquor stream to the conversion unit for converting into the conversion end slurry.

For example, the systems can further comprise a flotation unit for separating the conversion end solids stream into a schoenite slurry stream and a tailings slurry stream, the schoenite stream received by the leaching unit for leaching to produce a mother liquor stream and a schoenite stream.

For example, the systems can further comprise a tailings unit for leaching the tailings slurry stream with a dilute brine stream to produce a tailings stream and a brine recycle stream, the brine recycle stream comprising potassium.

For example, the systems can further comprise crystallizer recycle piping for returning the crystallizer mother liquor stream to the leaching unit to produce the mother liquor stream and the schoenite stream.

For example, the systems can further comprise concentrator recycle piping for returning the mother liquor stream to the conversion unit for converting into the conversion end slurry.

For example, the systems can further comprise a solid-liquid separator for separating a crystallized potassium sulfate stream from the crystallization product stream.

For example, a crystallized potassium sulfate product stream comprising potassium sulfate and a recycle stream can be produced by separating the potassium sulfate product stream in a solid-liquid separating unit.

For example, the systems can further comprise a solid-liquid separating unit coupled to the crystallization unit for separating the potassium sulfate product stream into a crystallized potassium sulfate stream and a recycle stream.

For example, the systems can further comprise piping for returning the recycle stream to the crystallization unit.

For example, the systems can further comprise a tailings unit for leaching the tailings slurry stream with a dilute brine stream to produce a tailings stream and a brine recycle stream, the brine recycle stream comprising potassium.

For example, the systems can further comprise a heat pump for collecting heat generated in the conversion unit.

For example, at least a portion of the heat collected from the conversion unit is provided to the crystallization unit to regulate a temperature of the potassium sulfate product stream and the crystallizer mother liquor stream contained in the crystallization unit.

For example the heat pump can maintain the temperature at a value of about 45° C. to about 60° C.

For example, the heat pump can regulates a temperature of the mixed salts feed stream and the conversion end slurry contained in the conversion unit.

For example, the heat pump can maintain the temperature at a value of about 10° C. to about 40° C.

For example, the conversion unit for converting the mixed salts feed stream into a conversion end slurry can be at a temperature of about 10° C. to about 40° C.

For example, the crystallization unit for leaching the conversion end slurry with water can be at a temperature of about 45° C. to about 60° C.

For example, the heat pump can collect heat generated in the conversion unit to control a temperature of the conversion unit at about 10° C. to about 40° C.

For example, the heat pump can provide at least a portion of the heat collected from the conversion unit to the crystallization unit to control a temperature of the crystallization unit at about 45° C. to about 60° C.

For example, the heat pump can expel at least a portion of the heat collected from the conversion unit from the heat pump as excess heat.

For example, the heat pump can further collect heat generated in the concentrating unit.

For example, the heat pump collects heat generated in the leaching unit to maintain a temperature of the mother liquor stream and the schoenite stream in the leaching unit at a value of about 10° C. to about 40° C.

For example, the heat pump can collect heat generated in the leaching unit to maintain a temperature of the potassium sulfate product stream and the crystallizer mother liquor stream contained in the crystallization unit at a value of about 45° C. to about 60° C.

For example, the brine recycle stream can be forwarded for further processing for potassium recovery.

For example, the crystallizer mother liquor can be returned to the leaching unit to produce the mother liquor stream and the schoenite stream.

For example, the mother liquor stream can be returned to the conversion unit for the conversion of the mixed salts feed stream into the conversion end slurry.

For example, the systems can further comprise a solid-liquid separating unit coupled to the crystallization unit for separating the potassium sulfate product stream into a solid potassium sulfate stream and a recycle stream.

For example, the systems can further comprise piping for returning the recycle stream to the crystallization unit.

For example, the systems can further comprise a heat pump for collecting heat generated in the conversion unit.

For example, at least a portion of the heat collected from the conversion unit can be provided to the crystallization unit to regulate a temperature of the potassium sulfate product stream and the crystallizer mother liquor stream contained in the crystallization unit.

For example, the heat pump can regulate a temperature of the mixed salts feed stream and the conversion end slurry contained in the conversion unit.

For example, the conversion unit for converting the mixed salts feed stream into the conversion end slurry can be at a temperature of about 10° C. to about 40° C.

For example, the heat pump can collect heat generated in the conversion unit to control a temperature of the conversion unit at about 10° C. to about 40° C.

For example, the heat pump provides at least a portion of the heat collected from the conversion unit to the crystallization unit to control a temperature of the crystallization unit at about 45° C. to about 60° C.

For example, the heat pump can expel at least a portion of the heat collected from the conversion unit from the heat pump as excess heat.

For example, the heat pump can further collect heat generated in the concentrating unit.

For example, the heat pump can collect heat generated in the leaching unit to maintain a temperature of the mother liquor stream and the schoenite stream in the leaching unit at a value of about 10° C. to about 40° C.

For example, the heat pump can collect heat generated in the leaching unit to maintain a temperature of the potassium sulfate product stream and the crystallizer mother liquor stream contained in the crystallization unit at a value of about 45° C. to about 60° C.

For example, the systems can further comprise producing the mixed salts stream in a flotation unit prior to converting the mixed salts stream in the conversion unit.

For example, the temperature of the conversion unit and/or its content can be at about 15° C. to about 35° C., at about 15° C. to about 30° C., or at about 20° C. to about 30° C.

For example, the temperature of the crystallization unit and/or its content can be at about 50° C. to about 60° C. or about 55° C. to about 60° C.

Figure 1:
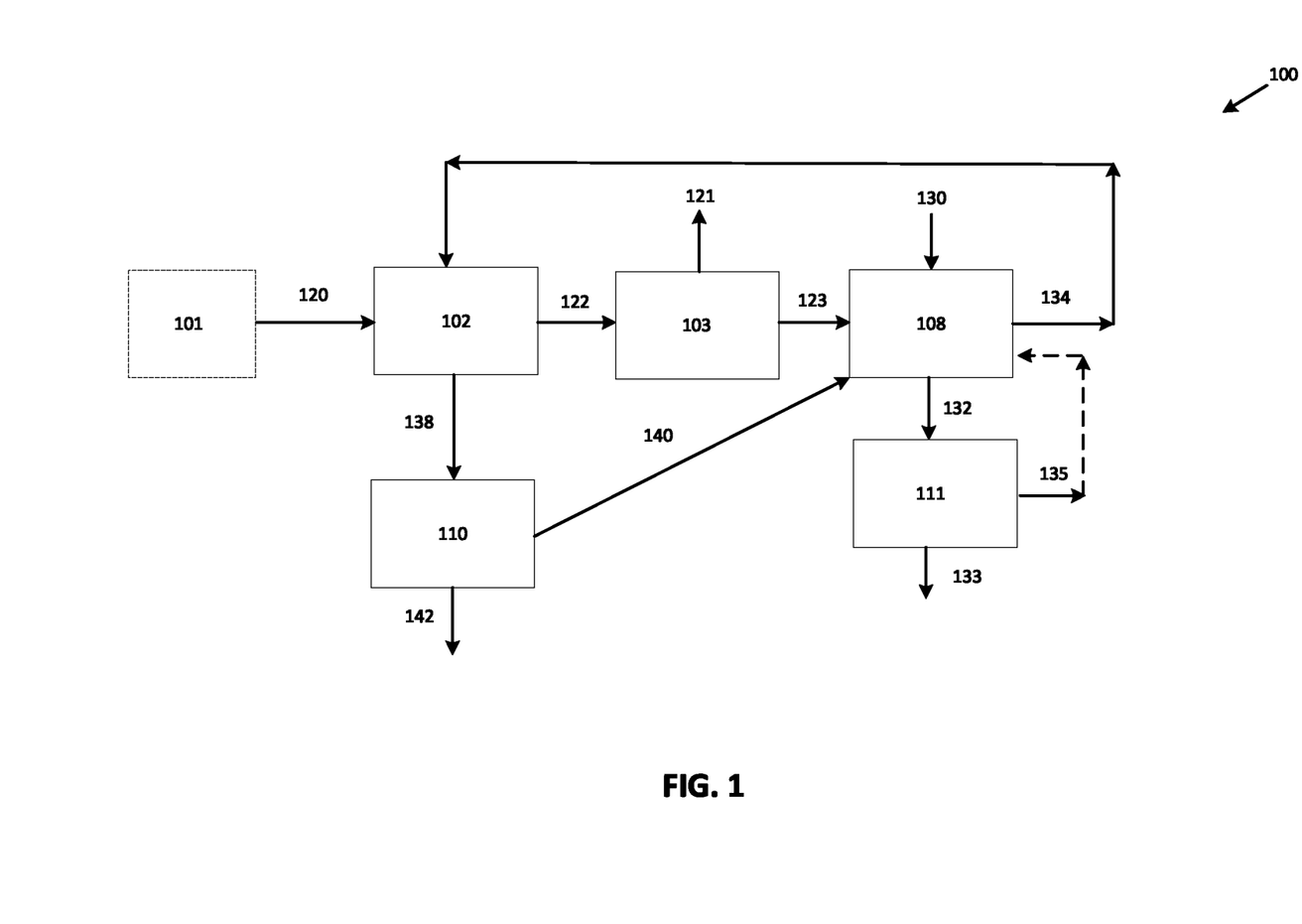
FIG. 1 is a schematic view of a system for producing potassium sulfate, according to one embodiment.

Referring to FIG. 1, illustrated therein is a system 100 for producing potassium sulfate. The system includes a conversion unit 102, a solid-liquid separating unit 103, a crystallization unit 108, a heat pump 110 and a solid-liquid separating unit 111. The conversion unit 102 and the crystallization unit 108 can be any appropriate vessel for performing a conversion and crystallization reaction therein, respectively.

Conversion unit 102 and solid-liquid separation unit 103 are fluidly coupled (e.g. by piping) to provide for the flow of liquid there between. Similarly, solid-liquid separation unit 103 and crystallization unit 108 are fluidly coupled (e.g. by piping) to provide for the flow of liquid there between. Heat pump 110 can be any appropriate heat pump 110 for collecting heat from conversion unit 102 and providing heat to crystallization unit 108. Heat pump 110 is fluidly coupled to each of conversion unit 102 and crystallization unit 108 to provide for said transfer of heat therebetween.

Conversion unit 102 converts a mixed salts feed stream 120 into a conversion end slurry 122 by a process of dissolution of parent solids and precipitation of schoenite. Mixed salts feed stream 120 includes at least one potassium-containing salt, at least one chloride-containing salt, at least one magnesium-containing salt and at least one sulfate-containing salt. Mixed salts feed 120 may also include at least one calcium-containing salt. Further, magnesium salts may be present as part of double salts or as standalone salts.

In one embodiment, prior to conversion unit 102, a beneficiation unit 101 can be used to separate components to produce a beneficiated mixed salts feed stream 120. For example, beneficiation unit 101 may include flotation separation, size classification separation, density classification separation or any other appropriate separation mechanism.

The conversion end slurry 122 includes schoenite solids in a conversion end brine. In some embodiments, the conversion end slurry 122 may also include some forms of hydrated magnesium sulfate and/or residual sodium chloride solids. The conversion end slurry 122 may also possibly include small amounts of at least one solid chosen from a magnesium bearing salt (for example Epsomite), sodium chloride, and mixtures thereof. These solids are generally in suspension in the conversion end brine that includes potassium, magnesium, sodium, chloride and sulfate ions in a water solution. In some embodiments, the conversion end brine may be saturated with respect to schoenite and unsaturated with respect to sodium chloride and Epsomite.

The net result of dissolution and precipitation reactions of the mixed salts feed stream 120 in conversion unit 102 to produce the conversion end slurry 122 is exothermic. Accordingly, at least a portion of the heat generated by the exothermic reaction within the conversion unit 102 is collected by a heat pump 110 coupled to the conversion unit 102 (e.g. by piping) as a first heat source 138.

For example, heat collected from the conversion unit 102 by the heat pump 110 (e.g. as first heat source 138) can regulate a temperature of the mixed salts feed stream 120 and the conversion end slurry 122 contained in the conversion unit 102. In another example, the collection of heat from the conversion unit 102 by the heat pump 110 (e.g. as first heat source 138) can maintain a temperature of the mixed salts feed stream 120 and the conversion end slurry 122 contained in the conversion unit 102 at a value of about 10° C. to about 40° C. In another example, heat collected from the conversion unit 102 by the heat pump 110 (e.g. as first heat source 138) can be used to control a temperature of the mixed salts feed stream 120 and the conversion end slurry 122 contained in the conversion unit 102. In another example, the collection of heat from the conversion unit 102 by the heat pump 110 (e.g. as first heat source 138) can control a temperature of the mixed salts feed stream 120 and the conversion end slurry 122 contained in the conversion unit 102 at a temperature of about 10 to about 40° C.

In the embodiment shown in FIG. 1, conversion end slurry 122 can be separated into a conversion solids end stream 123 and a conversion end brine 121 in a solid-liquid separation unit 103. Solid-liquid separation unit 103 can be a filter, a centrifuge, a cyclone, a thickener, a clarifier or any other appropriate unit for performing a solid/liquid separation on conversion end slurry 122.

Crystallization unit 108 receives the conversion solids 123 including schoenite from solid/liquid separation in unit 103. Within the crystallization unit 108, schoenite from the conversion solids 123 is leached (e.g. with water 130, as shown in FIG. 1) to produce a potassium sulfate product stream 132 comprising potassium sulfate solids and a crystallizer mother liquor stream 134 comprising magnesium sulfate and potassium sulfate.

The leaching reaction of the conversion solids 123 with water to produce the potassium sulfate product stream 132 having potassium sulfate and the crystallizer mother liquor stream 134 having magnesium sulfate and potassium sulfate is endothermic. Accordingly, at least a portion of the heat collected by the heat pump 110 from the conversion unit 102 as the first heat source 138 can be provided to the crystallization unit 108 as a heat sink 140 to regulate a temperature of crystallization unit 108.

A person skilled in the art would understand that that various mechanisms for transferring heat to crystallization unit 108 to regulate a temperature of the potassium sulfate product stream 132 and the crystallizer mother liquor stream 134 contained in the crystallization unit 108. For example, heat from heat pump 110 could be applied to a body of crystallization unit 108 or to any of the inputs streams of crystallization unit 108, such as conversion end solids 123 (see FIG. 1), leached schoenite 129 (see FIGS. 2 and 3), water 130, or recycle stream 135. Heat from heat pump 110 may also be applied via heating a recirculation of the slurry of unit 108 via a heat exchanger or by heating any one or any combination of the conversion end solids 123, leached schoenite 129 water 130, or recycle stream 135 via a heat exchanger. Heating coils or any other appropriate mechanism known to a person skilled in the art may also be used to transfer heat to crystallization unit 108 to regulate a temperature of the potassium sulfate product stream 132 and the crystallizer mother liquor stream 134 therein.

In an example, at least a portion of the heat collected from the conversion unit 102 by the heat pump 110 as first heat source 138 can be provided to the crystallization unit 108 as heat sink 140 to maintain a temperature of the potassium sulfate product stream 132 and the crystallizer mother liquor stream 134 contained in the crystallization unit 108 at a value of about 45 to about 60° C. In another example, heat collected from the conversion unit 102 by the heat pump 110 as the first heat source 138 can be provided as heat sink 140 to the crystallization unit 108 to control a temperature of the potassium sulfate product stream 132 and the crystallizer mother liquor stream 134 contained in the crystallization unit 108 at a value of about 45 to about 60° C. In another example, the collection of heat from the conversion unit 102 by the heat pump 110 as first heat source 138 can be provided as heat sink 140 to the crystallization unit 108 to control a temperature of the potassium sulfate product stream 132 and the crystallizer mother liquor stream 134 contained in the crystallization unit 108 at a value of about 45 to about 60° C.

Heat pump 110 can also be configured to expel excess heat 142 received from conversion unit 102.

Crystallizer mother liquor stream 134 is returned to the conversion unit 102 from the crystallization unit 108 for mixing with the mixed salts feed stream 120 for the conversion into the conversion end slurry 122.

Potassium sulfate product stream 132 comprises pure potassium sulfate solids in a mother liquor. Potassium sulfate product stream 132 can be separated into a solid (i.e. crystallized) potassium sulfate product stream 133 to be dried and a recycle stream 135 containing mother liquor and very fine solids in a solid-liquid separation unit 111. The recycle stream 135 can be returned to the crystallizer unit 108. Solid-liquid separation unit 111 can be a filter, a centrifuge, a cyclone, a thickener, a clarifier or any other appropriate unit for performing a solid/liquid separation on crystallizer slurry end stream 132.

Figure 2:
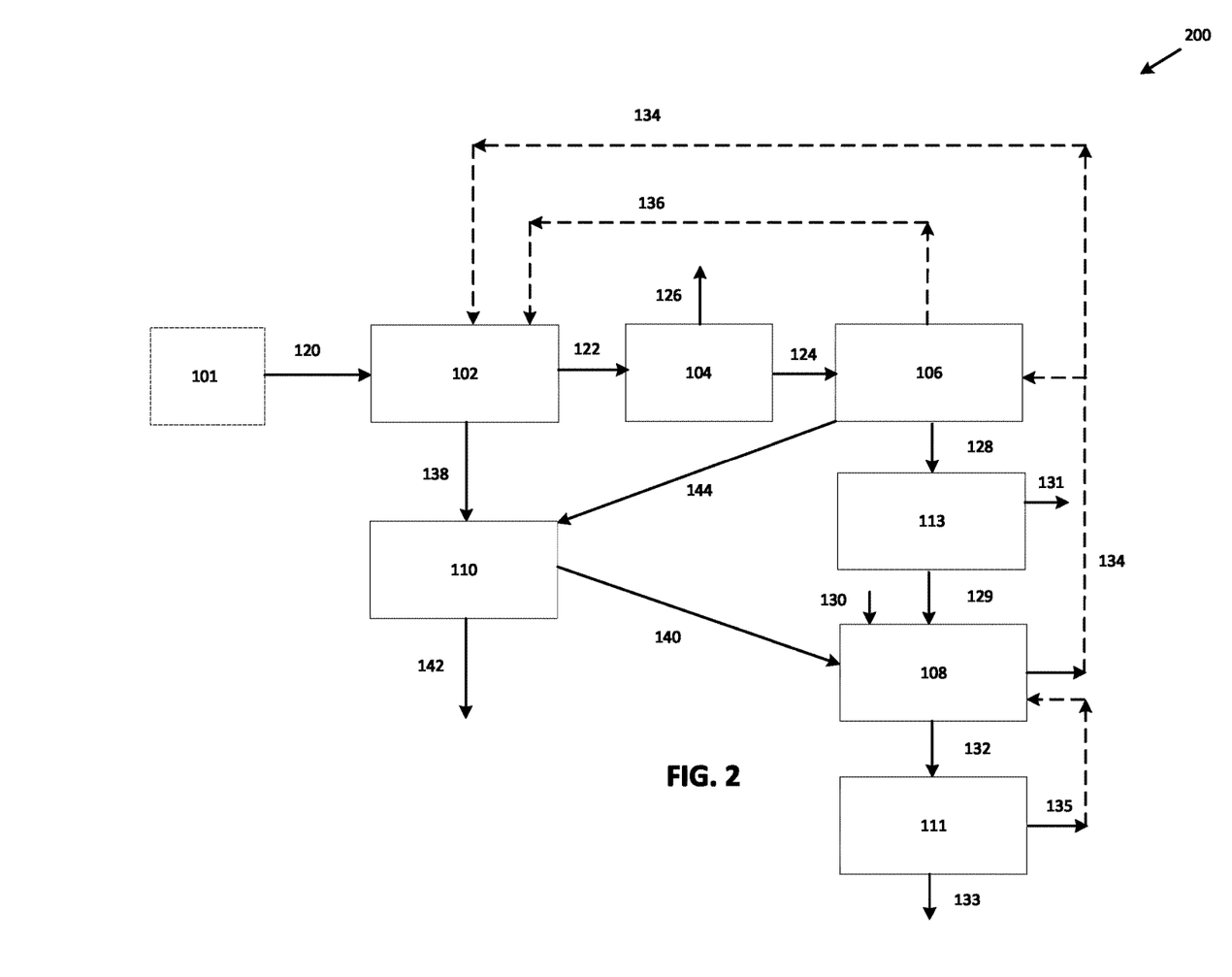
FIG. 2 is a schematic view of a system for producing potassium sulfate, according to a second embodiment.

Turning to FIG. 2, illustrated therein is a system 200 for producing potassium sulfate. The system includes the conversion unit 102, the crystallization unit 108, the solid-liquid separating unit 111 from system 100, with a flotation unit 104 and a leaching unit 106 each disposed between the conversion unit 102 and the crystallization unit 108, and a solid-liquid separating unit 113 coupled to leaching unit 106. Heat pump 110 may optionally be included in system 200. Leaching unit 106 can be any appropriate equipment for housing a leaching reaction therein. Leaching unit 106 is fluidly coupled (e.g. by piping) to the conversion unit 102 to receive conversion end solids 123 from the conversion unit 102. Leaching unit 106 may also be fluidly coupled (e.g. by piping) to the crystallization unit 108 to provide a schoenite stream 128 to the crystallization unit 108.

Generally, in the flotation unit 104, flotation reagents with which conversion slurry 122 has been mixed (not shown) prior to entering the flotation unit 104 alter surface characteristics of the species to be floated, in this case schoenite. This modification is such that air bubbles introduced into flotation unit 104 attach to the solids to be floated (e.g. schoenite) and not to undesirable solids. This causes the schoenite solids to rise to the top of the agitated slurry in the flotation unit 104 where it can be removed as the concentrate stream, schoenite slurry stream 124. The solids not affected by the flotation reagents (e.g. other solids of conversion end slurry 122) stay on the bottom of the flotation unit 104 to be removed as the tailings slurry stream 126. The separation thus achieved is typically not a complete separation, with some of the undesirable tailings being floated, or more usually trapped in the rising mass of concentrate solids, and some of the desirable species (in this case schoenite) not floating (e.g. for a variety of reasons) and exiting the flotation unit 104 with the tailings slurry stream 126. It should also be understood by those practiced in the art that the undesirable solids may be the species floated in a process commonly referred to as "reverse flotation", and in this case it would be the tailings stream (e.g. tailings stream 126) that comes to the top of the flotation unit 104 and the concentrate stream (e.g. schoenite slurry stream 124) that does not float. Generally then, flotation results in a schoenite (or desired species) enriched concentrate stream (e.g. conversion end slurry 122) and a schoenite impoverished tails stream (e.g. tailings slurry stream 126). The flotation unit 104 can be any appropriate vessel for providing for separating the conversion end slurry 122 into a schoenite slurry stream 124 and a tailings slurry stream 126 by flotation.

The leaching reaction that occurs within the leaching unit 106 generally generates heat. For example, crystallization of schoenite, as may occur in the leaching unit 106, is an exothermic reaction. Further to this, dissolution of salts can also generate heat in the crystallization unit 106. Further still, in embodiments where the mother liquor 134 is returned to the leaching unit 106 from the crystallization unit, additional heat can be present in the leaching unit and available for removal by the heat pump 110. Therefore, heat pump 110 is also fluidly coupled (e.g. by piping) to leaching unit 106 to collect heat from leaching unit 106. Accordingly, at least a portion of the heat generated within the leaching unit 106 is collected by heat pump 110 coupled to the leaching unit 106 (e.g. by piping) as a second heat source 144. For example, heat collected from the leaching unit 106 by the heat pump 110 as the second heat source 144 can regulate a temperature of the schoenite stream 128 contained in the leaching unit 106. In another example, the collection of heat from leaching unit 106 by the heat pump 110 as second heat source 144 can maintain a temperature of the conversion end slurry 122 contained in the leaching unit 106 at a value of about 10 to about 40° C. In another example, heat collected from the leaching unit 106 by the heat pump 110 as the second heat source 144 can be used to control a temperature of the conversion end slurry 128 contained in the leaching unit 106. In another example, the collection of heat from the leaching unit 106 by the heat pump 110 as second heat source 144 can control a temperature of the schoenite stream 128 contained in the leaching unit 106 at a value of about 10 to about 40° C.

In one embodiment (as indicated with dashed lines on FIG. 2), the crystallizer mother liquor stream 134 having magnesium sulfate and potassium sulfate can be returned from the crystallization unit 108 to the leaching unit 106 to produce a leach end brine 136 and a leached schoenite stream 128. As noted above, leached schoenite stream 128 comprises a solid and a liquid phase that can be separated by a solid/liquid separator (not shown) for providing the solids therefrom to the crystallization unit 108.

In another embodiment (as indicated with dashed lines on FIG. 2), the crystallizer mother liquor stream 134 having magnesium sulfate and potassium sulfate can be returned from the crystallization unit 108 to the conversion unit 102 to produce the conversion end slurry 122. In another embodiment (as indicated with dashed lines on FIG. 2), the crystallizer mother liquor stream 134 having magnesium sulfate and potassium sulfate can be returned from the crystallization unit 108 to the leaching unit 106. In some embodiments, at least a portion of the magnesium sulfate and at least a portion of the potassium sulfate in the conversion end slurry 122 fed to the flotation unit 104 is contained in the crystallizer mother liquor 134, which is returned to either of the conversion unit 102 or the leaching unit 106 to react with the mixed feed salts stream 120 or the schoenite slurry stream 124, respectively.

In another embodiment (as indicated with dashed lines on FIG. 2), the mother liquor stream 136 including potassium, magnesium, sodium, chloride and/or sulfate ions in a water solution can be returned from the leaching unit 106 to the conversion unit 102 to produce the conversion end slurry 122.

Also shown in FIG. 2, leaching unit 106 is coupled to a solid-liquid separation unit 113 for separating leached schoenite 129 and leach end brine 131 from schoenite stream 128. This solid-liquid separation unit 113 may be a filter, a centrifuge, a cyclone, a thickener, a clarifier or any other appropriate unit for performing a solid/liquid separation on schoenite stream 128. Leached schoenite 129 is fed from the solid-liquid separation unit 113 to the crystallizer unit 108 for crystallization. The separated leach end brine 131 may be utilized elsewhere in the process (not shown).

Figure 3:
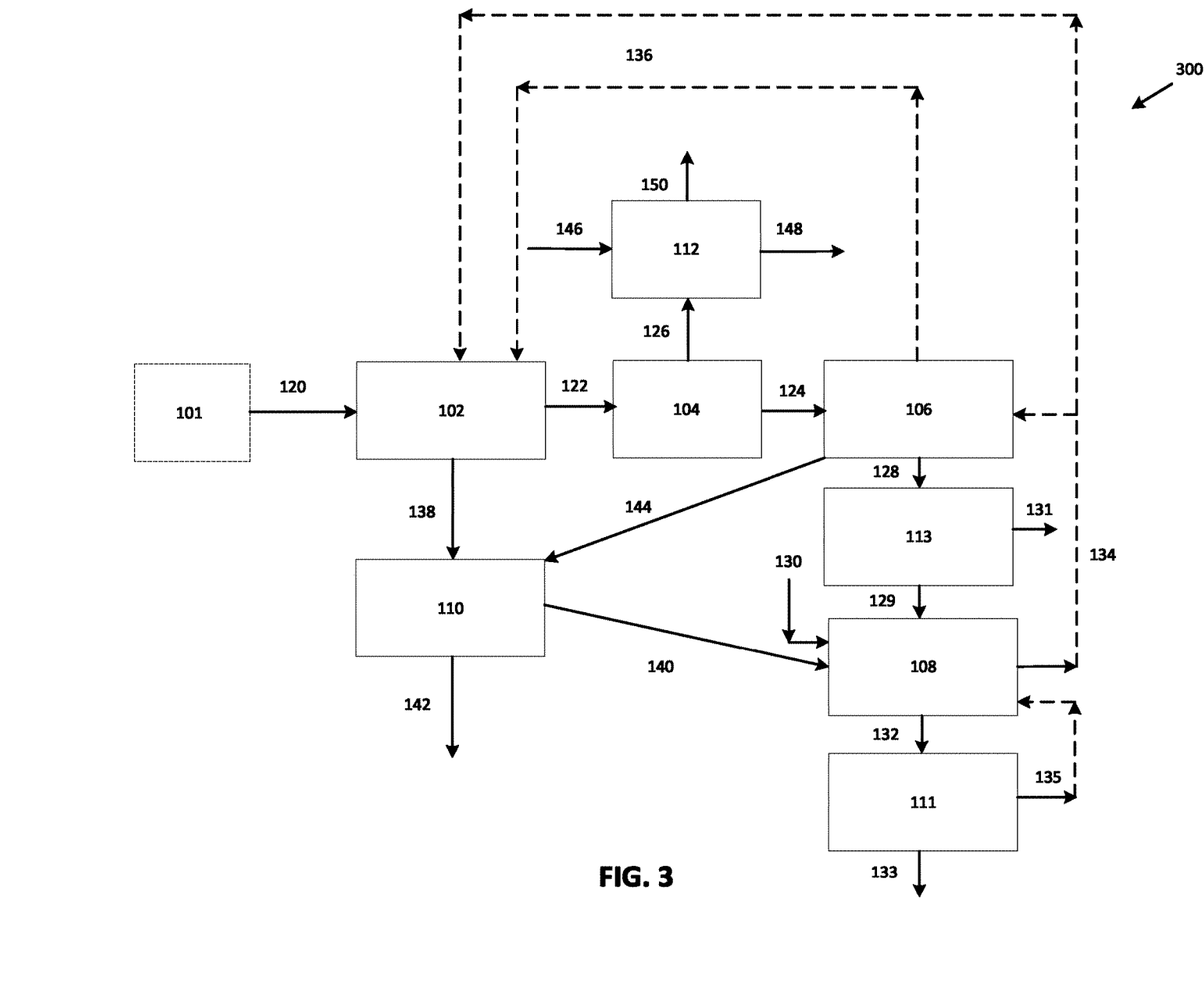
FIG. 3 is a schematic view of a system for producing potassium sulfate, according to a third embodiment.

Turning to FIG. 3, illustrated therein is a system 300 for producing potassium sulfate. The system includes the conversion unit 102, the flotation unit 104, the leaching unit 106, the crystallization unit 108, the solid-liquid separating unit 111, and the solid-liquid separating unit 113 from system 200, and an additional leaching unit 112 coupled to flotation unit 104. Heat pump 110 may optionally be included in system 300.

System 300 includes a tailings unit 112 fluidly coupled to the flotation unit 104. In some embodiments, a solid/liquid separator (not shown) may receive tailings from flotation unit 104 to separate solids therefrom for providing to tailings unit 112. Flotation unit 104 may also be fluidly coupled to the tailings unit 112 to provide a tailings slurry stream 126 to the tailings unit 112 for recovery or further processing.

Tailings unit 112 can also receive a dilute brine stream 146 for mixing with the tailings slurry stream 126 to form a brine recycle stream 148 and a tailings stream 150. Dilute brine stream 146 may include water, dissolved salts (e.g. potassium sulfate, magnesium sulfate, sodium chloride, halite, etc. Further, dilute brine stream 146 may be saturated in one species (e.g. potassium and/or magnesium sulfate) and unsaturated in another species (e.g. halite). Dilute brine stream 146 may dissolve potassium and potassium bearing minerals present in the tailings slurry stream 126

Brine recycle stream 148 may be forwarded for further processing and potassium recovery. Tailings stream 150 is generally saturated in sodium chloride.

In another embodiment, a solid/liquid separator (not shown) may receive schoenite slurry stream 124 from flotation unit 104 to separate solids therefrom for providing to leaching unit 106.

Figure 4:
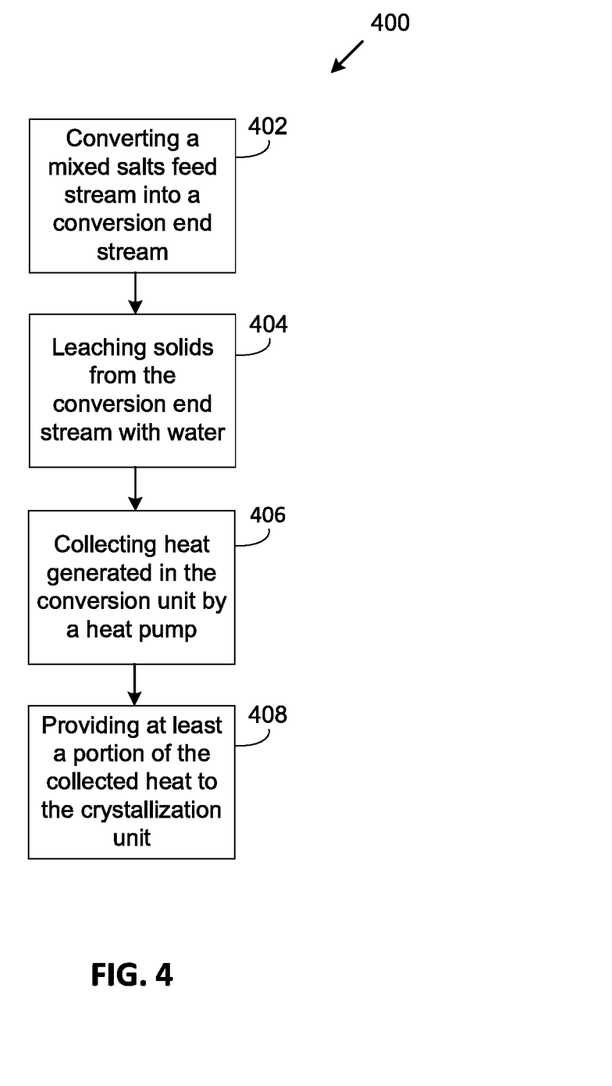
FIG. 4 is a block diagram of a method for producing potassium sulfate, according to one embodiment.

Turning to FIG. 4, illustrated therein is a method of producing potassium sulfate 400. The method 400 includes, at step 402, converting a mixed salts feed stream 120 into a conversion end slurry 122 in a conversion unit 102. The mixed salts feed stream 120 includes at least one potassium-containing salt, at least one chloride-containing salt, at least one magnesium-containing salt and at least one sulfate-containing salt. The conversion end slurry 122 includes schoenite. Step 402 also includes separating the conversion end slurry 122 into a conversion end brine 121 and a conversion solids stream 123. Conversion solids stream 123 is then directed towards crystallization unit 108.

At step 404, conversion solids stream 123 is leached with water 130 in a crystallization unit 108 to produce a potassium sulfate product stream 132 having potassium sulfate therein, and a crystallizer mother liquor stream 134 including magnesium sulfate and potassium sulfate. Leaching step 404 may also include separating a solid potassium sulfate stream 133 and recycle stream 135 from potassium sulfate product stream 132 using a solid-liquid separating unit 111. Recycle stream 135 may be provided back to the crystallization unit 108.

At step 406, heat generated in the conversion unit 102 is collected by a heat pump 110.

At step 408, at least a portion of the heat collected from the conversion unit 102 is provided to the crystallization unit 108 to regulate a temperature of the potassium sulfate product stream 132 and the crystallizer mother liquor stream 134 contained in the crystallization unit 108.

Figure 5:
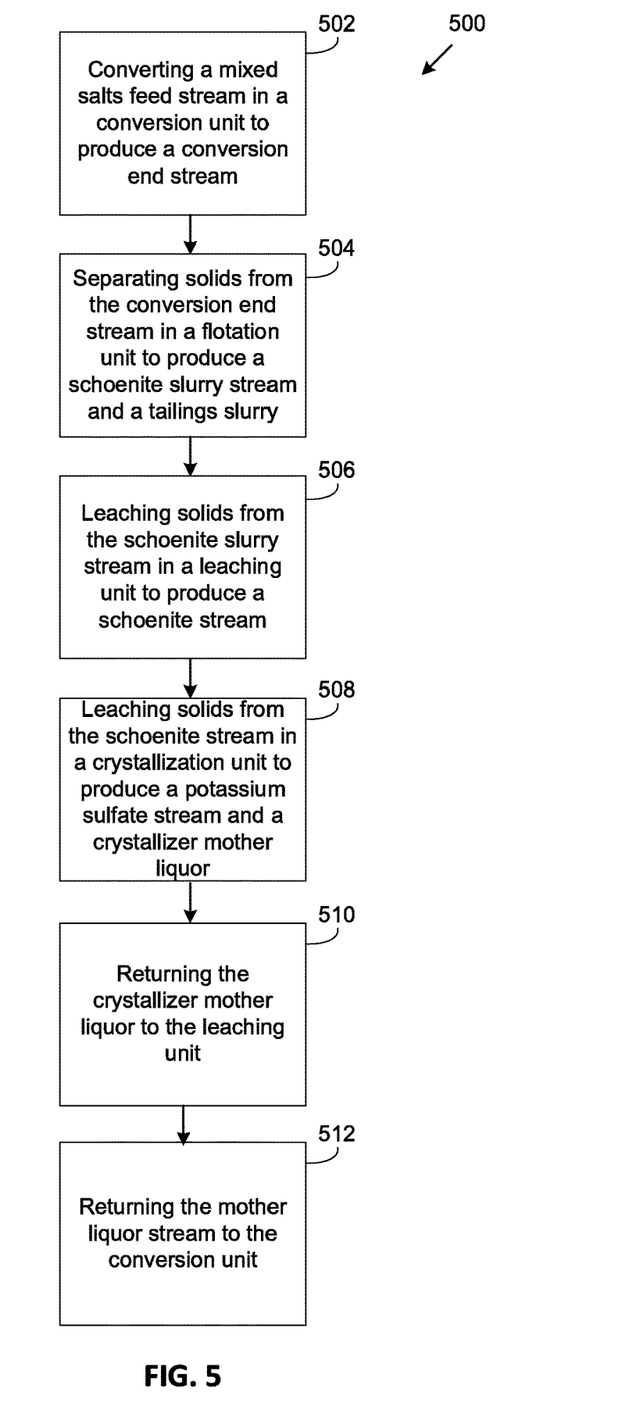
FIG. 5 is a block diagram of a method for producing potassium sulfate, according to another embodiment.

Turning to FIG. 5, illustrated therein is a method of producing potassium sulfate 500. The method 500 includes, at step 502, converting a mixed salts feed stream 120 into conversion end slurry 122 in a conversion unit 102. The mixed salts feed stream 120 includes at least one potassium-containing salt, at least one chloride-containing salt, at least one magnesium-containing salt and at least one sulfate-containing salt. The conversion end slurry 122 includes schoenite. Step 502 may also include separating the conversion end slurry 122 into a conversion end brine 121 and a conversion solids stream 123. Conversion solids stream 123 is then directed towards flotation unit 106 and/or leaching unit 108.

At step 504, conversion end slurry 122 is separated in a flotation unit 104 into a schoenite slurry stream 123 and a tailings slurry stream 126.

At step 506, solids from the schoenite slurry stream 124 (as separated in a solid/liquid separator, not shown) are leached in a leaching unit 106 to produce a mother liquor stream 136 and a schoenite stream 128.

At step 508, solids from the schoenite stream 128 (as separated in a solid/liquid separator 113) are leached with water 130 in a crystallization unit 108 to produce potassium sulfate product stream 132 having potassium sulfate therein, and a crystallizer mother liquor stream 134 including magnesium sulfate and potassium sulfate.

At step 510, the crystallizer mother liquor stream 134 is returned to the leaching unit 106 to produce the mother liquor stream and the schoenite stream.

At step 512, the mother liquor stream 136 is returned to the conversion unit 102 for the conversion of the mixed salts feed stream 120 into the conversion end slurry 122.

Figure 6:
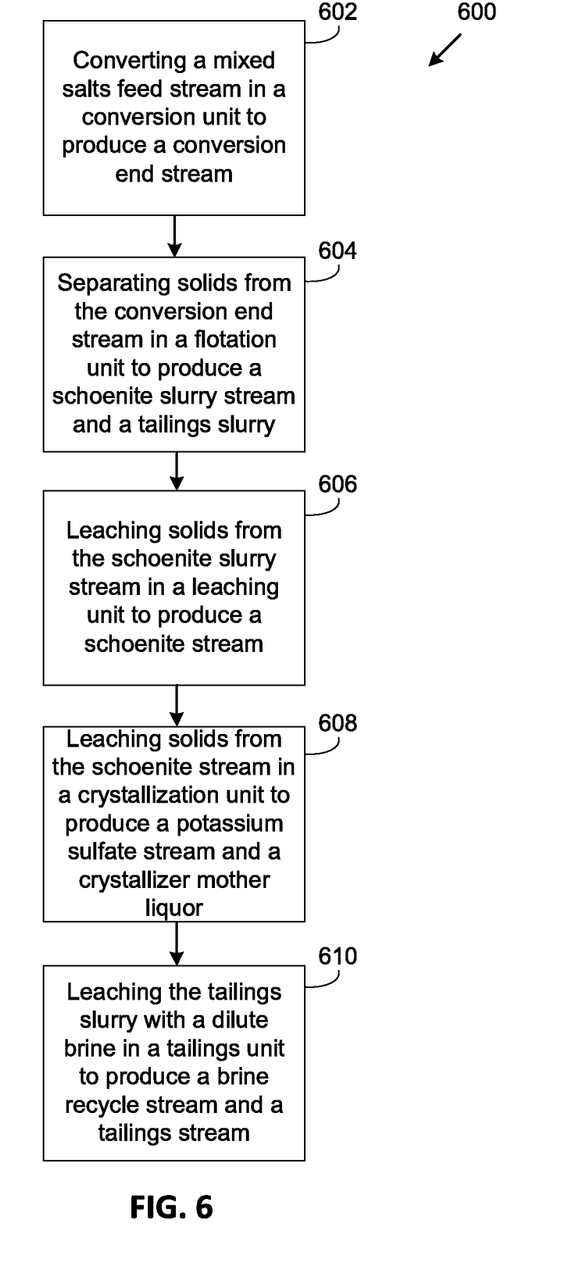
FIG. 6 is a block diagram of a method for producing potassium sulfate, according to another embodiment.

Turning to FIG. 6, a method of producing potassium sulfate 600 is shown. The method 600 includes, at step 602, converting a mixed salts feed stream 120 into a conversion end slurry 122 in a conversion unit 102. The mixed salts feed stream 120 includes at least one potassium-containing salt, at least one chloride-containing salt, at least one magnesium-containing salt and at least one sulfate-containing salt. The conversion end slurry 122 includes schoenite. Step 602 also includes separating the conversion end slurry 122 into a conversion end brine 121 and a conversion solids stream 123. Conversion solids stream 123 is then directed towards flotation unit 106 and/or leaching unit 108.

At step 604, conversion solids stream 123 is separated in a flotation unit 104 into a schoenite slurry stream 124 and a tailings slurry stream 126.

At step 606, solids from the schoenite slurry stream 124 (as separated in a solid/liquid separator, not shown) are leached in a leaching unit 106 to produce a mother liquor stream 136 and a schoenite stream 128.

At step 608, solids from the schoenite stream 128 (as separated in a solid/liquid separator 113) are leached with water 130 in a crystallization unit 108 to produce a potassium sulfate product stream 132 having potassium sulfate therein, and a crystallizer mother liquor stream 134 including magnesium sulfate and potassium sulfate.

At step 610, the tailings slurry stream 126 is leached with a dilute brine stream 146 in a tailings unit 112 to produce a tailings stream 150 and a brine recycle stream 148, the brine recycle stream including potassium.

EXAMPLES

In the course of development of the current innovation, different processes were developed based on the available resources and local conditions. Brines from different sources, with varying ions concentrations were considered. For example, K concentration between 0.01 and 5%, Na concentrations between 0.3 and 15%, Mg concentrations between 0 and 10%, Cl concentrations between 1 and 25% and SO4 concentrations between 0 and 10% were considered. These brines generated different feed salts which contained the right feed for K2SO4 processing. The solids range considered in the development of this innovation were NaCl concentrations between 10 and 60%, magnesium salts concentrations between 0 and 50%, potassium-bearing salts concentrations between 15 and 85%. Based on the potassium content of the salts fed to the plant and the composition of the salts out of the Conversion reactor, the requirement for flotation was established and the process further defined. In general, feeding the plant with salts containing more than 60% of potassium bearing salts allowed operations without flotation. In general, conversion outlet salts containing more than 80% potassium bearing salts allowed operations without flotation.

The embodiments of the paragraphs of the present disclosure are presented in such a manner in the present disclosure so as to demonstrate that every combination of embodiments, when applicable can be made. These embodiments have thus been presented in the description in a manner equivalent to making dependent claims for all the embodiments that depend upon any of the preceding claims (covering the previously presented embodiments), thereby demonstrating that they can be combined together in all possible manners. For example, all the possible combinations, when applicable, between the embodiments of any paragraphs and the methods, processes, systems and apparatuses of the Summary are hereby covered by the present disclosure.

While the above description provides examples of one or more apparatus, methods, or systems, it will be appreciated that other apparatus, methods, or systems may be within the scope of the claims as interpreted by one of skill in the art. In fact, the scope of the claims should not be limited by specific embodiments and examples provided in the disclosure, but should be given the broadest interpretation consistent with the disclosure as a whole.

What is claimed is:

1. A method of producing potassium sulfate, the method comprising:
converting a mixed salts feed stream into a conversion end slurry in a conversion unit, the mixed salts feed stream comprising at least one potassium-containing salt, at least one chloride-containing salt, at least one magnesium-containing salt and at least one sulfate-containing salt and the conversion end slurry comprising schoenite;
separating the conversion end slurry into a schoenite slurry stream and a tailings slurry stream in a flotation unit;
leaching the schoenite slurry stream in a leaching unit to produce a mother liquor stream and a schoenite stream;
separating the schoenite stream into a leached schoenite stream and a leach end brine stream by a solid-liquid separator;
leaching the leached schoenite stream with water in a crystallization unit to produce a potassium sulfate product stream comprising potassium sulfate and an crystallizer mother liquor stream comprising magnesium sulfate and potassium sulfate; and
leaching the tailings slurry stream with a dilute brine stream in a tailings unit to produce a tailings stream and a brine recycle stream, the brine recycle stream comprising potassium.

2. The method of claim 1, further comprising collecting heat generated in the conversion unit by a heat pump.

3. The method of claim 2, further comprising providing at least a portion of the heat collected from the conversion unit to the crystallization unit to regulate a temperature of the potassium sulfate product stream and the crystallizer mother liquor stream contained in the crystallization unit.

4. The method of claim 2, wherein the collecting heat generated in the conversion unit by a heat pump regulates a temperature of the mixed salts feed stream and the conversion end slurry contained in the conversion unit.

5. The method of claim 1, wherein at least a portion of the heat collected from the conversion unit is expelled from the heat pump as excess heat.

6. The method of claim 1, further comprising collecting heat generated in the leaching unit by the heat pump.

7. The method of claim 1, further comprising producing the mixed salts stream in a flotation unit prior to converting the mixed salts stream in the conversion unit.

8. A system for producing potassium sulfate, the system comprising:
- a conversion unit for converting a mixed salts feed stream into a conversion end slurry, the mixed salts feed stream comprising at least one potassium-containing salt, at least one chloride-containing salt, at least one magnesium containing salt and at least one sulfate-containing salt and the conversion end slurry comprising schoenite;
- a flotation unit coupled to the conversion unit for separating the conversion end slurry into a schoenite slurry stream and a tailings slurry stream;
- a leaching unit coupled to the flotation unit for leaching the schoenite slurry stream to produce a mother liquor stream and a schoenite stream; and
- a solid-liquid separating unit coupled to the leaching unit for separating the schoenite stream into a leach end brine stream and a leached schoenite stream;
- a crystallization unit coupled to the leaching unit for leaching the leached schoenite stream with water to produce a potassium sulfate product stream comprising potassium sulfate and a crystallizer mother liquor stream comprising magnesium sulfate and potassium sulfate;
- wherein the crystallizer mother liquor stream is returned to the leaching unit to produce the mother liquor stream and the schoenite stream; and
- wherein the mother liquor stream is returned to the conversion unit for the conversion of the mixed salts feed stream into the conversion end slurry.

9. The system of claim 8, further comprising a solid-liquid separating unit coupled to the crystallization unit for separating the potassium sulfate product stream into a crystallized potassium sulfate stream and a recycle stream.

10. The system of claim 9, further comprising piping for returning the recycle stream to the crystallization unit.

11. The system of claim 8, further comprising a tailings unit for leaching the tailings slurry stream with a dilute brine stream to produce a tailings stream and a brine recycle stream, the brine recycle stream comprising potassium.

12. The system of claim 8, further comprising a heat pump for collecting heat generated in the conversion unit.

13. The system of claim 11, wherein at least a portion of the heat collected from the conversion unit is provided to the crystallization unit to regulate a temperature of the potassium sulfate product stream and the crystallizer mother liquor stream contained in the crystallization unit.

14. The system of claim 12, wherein the heat pump regulates a temperature of the mixed salts feed stream and the conversion end slurry contained in the conversion unit.

15. A system of producing potassium sulfate, the system comprising:
- a conversion unit for converting a mixed salts feed stream into a conversion end slurry, the mixed salts feed stream comprising at least one potassium-containing salt, at least one chloride-containing salt, at least one magnesium containing salt and at least one sulfate-containing salt and the conversion end slurry comprising schoenite;
- a flotation unit coupled to the conversion unit for separating the conversion end slurry into a schoenite slurry stream and a tailings slurry stream;
- a leaching unit coupled to the flotation unit for leaching the schoenite slurry stream to produce a mother liquor stream and a schoenite stream;
- a solid-liquid separating unit coupled to the leaching unit for separating the schoenite stream into a leach end brine stream and a leached schoenite stream;
- a crystallization unit coupled to the leaching unit for leaching the leached schoenite stream with water to produce a potassium sulfate product stream comprising potassium sulfate and a crystallizer mother liquor stream comprising magnesium sulfate and potassium sulfate; and
- a tailings unit for leaching the tailings slurry stream with a dilute brine stream to produce a tailings stream and a brine recycle stream, the brine recycle stream comprising potassium.

16. The system of claim 15, wherein the leaching unit is configured to receive the crystallizer mother liquor stream from the crystallization unit.

17. The system of claim 16, wherein the conversion unit is configured to receive the mother liquor stream from the leaching unit.

18. The system of claim 15, further comprising a heat pump for collecting heat generated in the conversion unit.

19. The system of claim 18, wherein the crystallization unit is configured to receive at least a portion of the heat collected from the conversion unit to regulate a temperature of the potassium sulfate product stream and the crystallizer mother liquor stream contained in the crystallization unit.

20. The system of claim 18, wherein the heat pump regulates a temperature of the mixed salts feed stream and the conversion end slurry contained in the conversion unit.

21. The system of claim 20, wherein the heat pump maintains the temperature at a value of about 10° C. to about 40° C.

22. The system of claim 18, wherein the heat pump expels at least a portion of the heat collected from the conversion unit from the heat pump as excess heat.

23. The system of claim 18, wherein the heat pump further collects heat generated in the leaching unit.

24. The system of claim 23, wherein the heat pump collects heat generated in the leaching unit to maintain a temperature of the mother liquor stream and the schoenite stream in the leaching unit at a value of about 10° C. to about 40° C.

25. The system of claim 24, wherein the heat pump collects heat generated in the leaching unit to maintain a temperature of the potassium sulfate product stream and the crystallizer mother liquor stream contained in the crystallization unit at a value of about 45° C. to about 60° C.

* * * * *